United States Patent [19]

Sorgi et al.

[11] Patent Number: 4,844,387
[45] Date of Patent: Jul. 4, 1989

[54] MONITOR ARM APPARATUS

[75] Inventors: Dennis M. Sorgi; John T. Fleming, both of Statesville, N.C.

[73] Assignee: Hunt Holdings, Inc., Wilmington, Del.

[21] Appl. No.: 948,309

[22] Filed: Dec. 31, 1986

[51] Int. Cl.⁴ .................................................. E04G 3/00
[52] U.S. Cl. ..................................... 248/1 F; 248/1 B; 248/183; 248/281.1
[58] Field of Search ............. 248/1 A, 1 B, 1 C, 1 E, 248/1 F, 1 H, 1 I, 564, 584, 585, 586, 631, 646, 648, 651, 652, 660, 661, 662, 664, 122, 123.1, 124–125, 133, 371, 183, 185, 231.7, 278, 280.1, 281.1

[56] References Cited

U.S. PATENT DOCUMENTS

| | | |
|---|---|---|
| 967,877 | 8/1910 | Bauer . |
| 1,050,672 | 1/1913 | Macintosh . |
| 1,246,859 | 11/1917 | Boyd . |
| 3,358,957 | 12/1967 | Lindenmuth ......................... 248/1 E |
| 4,383,486 | 5/1983 | Reineman et al. . |
| 4,395,010 | 7/1983 | Helgeland ............................ 248/183 |
| 4,437,638 | 3/1984 | Scheibenpflug .................... 248/183 |
| 4,447,031 | 5/1984 | Souder, Jr. et al. . |
| 4,487,389 | 12/1984 | Ziegler . |
| 4,515,086 | 5/1985 | Kwiecinski ......................... 248/1 B |
| 4,561,620 | 12/1985 | Goetz ................................... 248/185 |
| 4,562,987 | 1/1986 | Leeds ................................... 248/1 E |
| 4,567,835 | 2/1986 | Reese et al. . |
| 4,568,052 | 2/1986 | Solomon et al. . |
| 4,619,427 | 10/1986 | Leymann ............................. 248/1 C |
| 4,687,167 | 8/1982 | Skalka ................................. 248/183 |
| 4,691,886 | 9/1987 | Wendling ............................ 248/1 E |
| 4,695,024 | 9/1987 | Haven ................................ 248/281.1 |
| 4,703,909 | 11/1987 | Dayton ............................... 248/280.1 |
| 4,768,744 | 9/1988 | Leeds ................................. 248/280.1 |

Primary Examiner—J. Franklin Foss
Assistant Examiner—Robert A. Olson
Attorney, Agent, or Firm—Albert L. Free

[57] ABSTRACT

An adjustable monitor arm apparatus for a personal computer, cathode ray tube, or video display tube monitor comprises an attachment member for attaching the monitor arm apparatus to the edge portion of a table or desk, a lower swivel member adapted to swivel 360 degrees connected to the attachment member, an upper swivel member adapted to swivel 360 degrees, a pair of arms extending between the lower swivel member and the upper swivel member, a platform adapted to swivel on the upper swivel member, and a pneumatic gas cylinder mounted between the upper arm and the lower arm for raising or lowering the platform without changing the altitude of the platform.

7 Claims, 3 Drawing Sheets

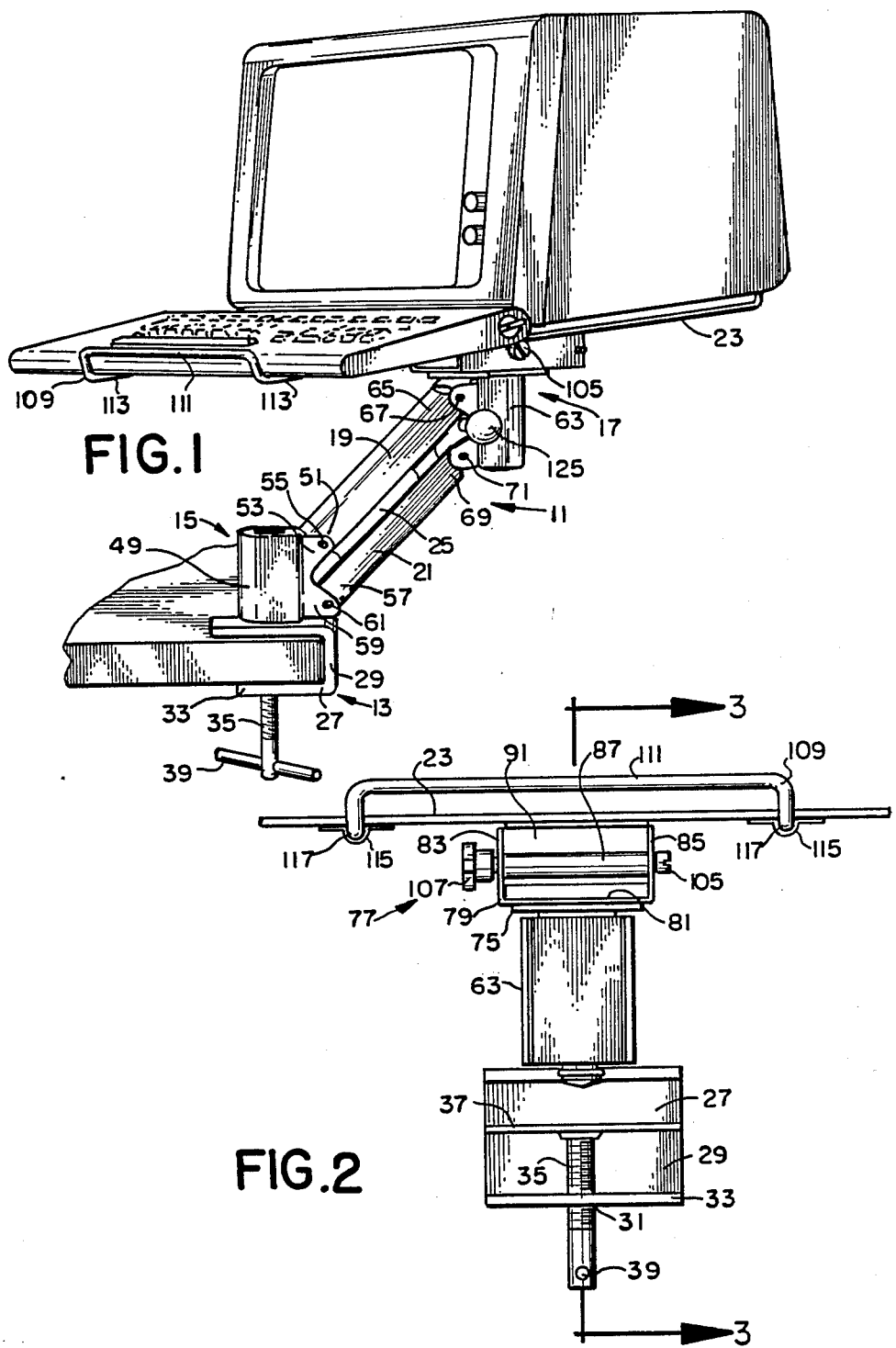

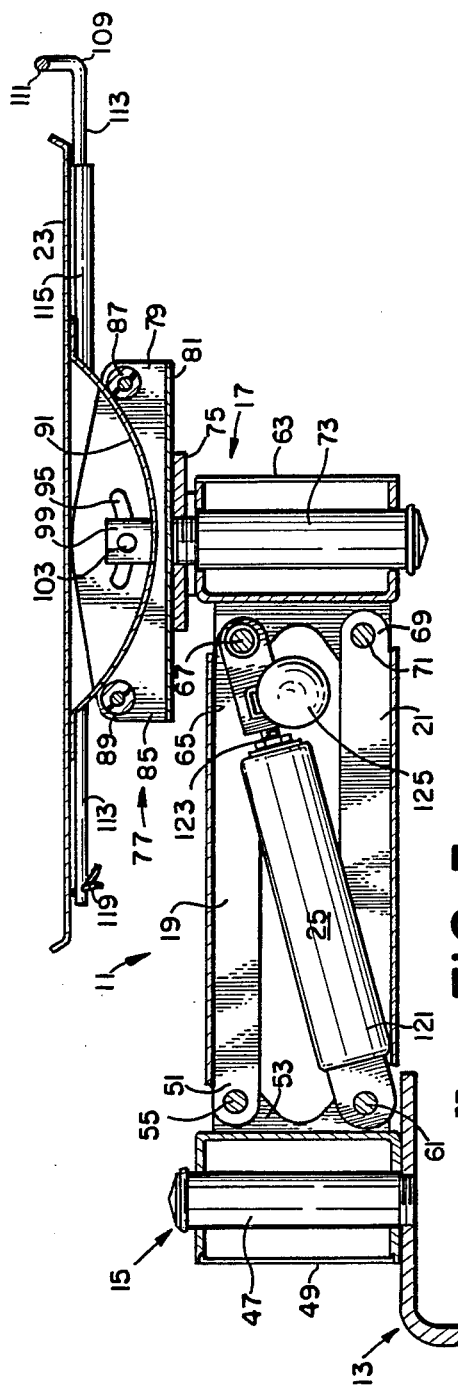

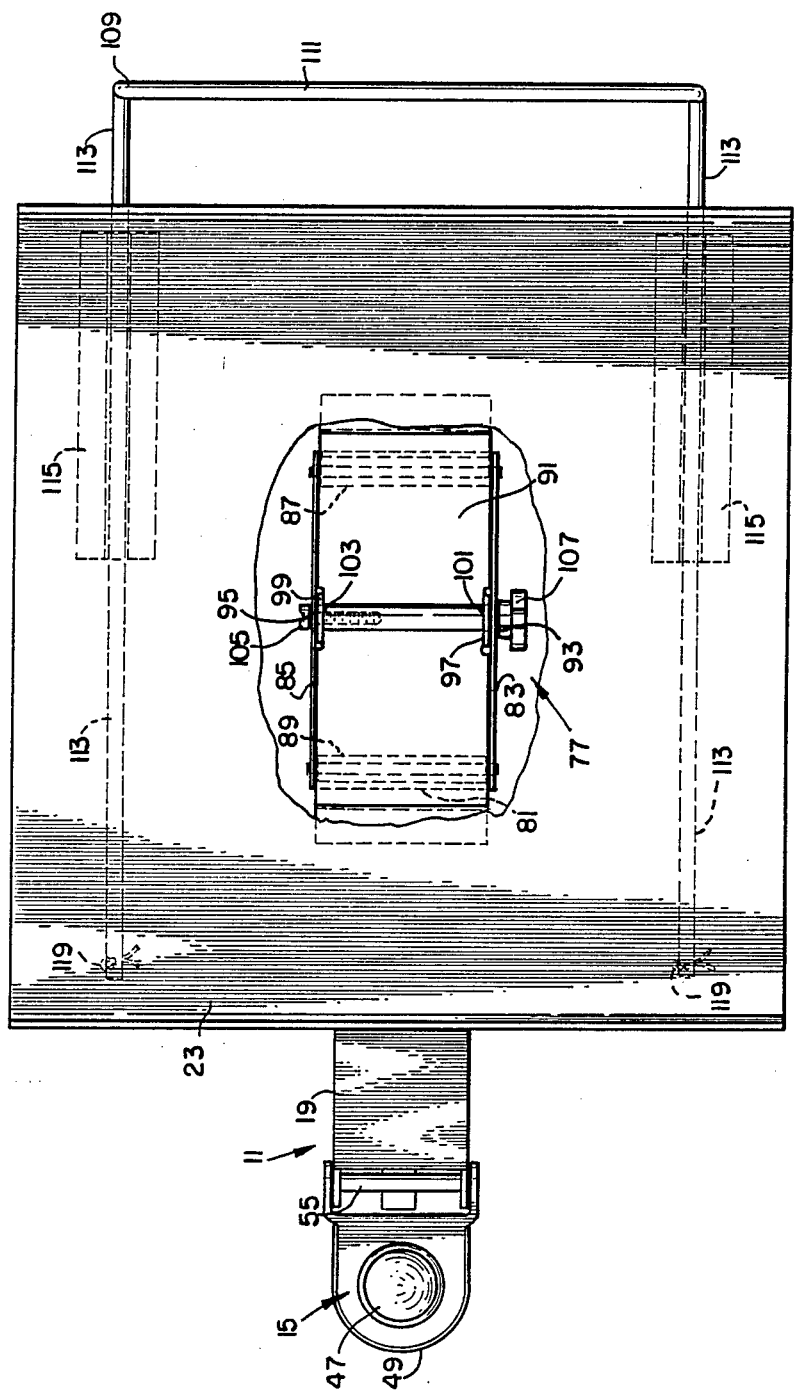

MONITOR ARM APPARATUS

BACKGROUND OF THE INVENTION

1. Field of the Invention

This invention relates to office computer work station equipment, and more particularly to an adjustable monitor arm for a PC (personal computer), CRT (cathode ray tube), or VDT (video display tube) monitor.

2. Description of the Prior Art

Since a personal computer is expensive, its shared use by office personnel is desirable. However, moving a personal computer from desk to desk or to different locations on a table is not only time consuming, but dangerous since personal computers, being delicate pieces of equipment, are easily damaged if dropped. Further, sharing a desk is often inconvenient.

The components of the personal computer, such as monitors and keyboards, occupy much of the work space of a table top or desk top of the work station, and this too, is a problem.

Other problems associated with the use of a personal computer at a work station are glare on the monitor screen and difficulty of positioning the monitor for easy reading of its screen.

Various monitor arms have been introduced in attempts to solve these problems. However, these monitor arms suffer from shortcomings such as either no height adjustability or height adjustability features that are difficult to use. One known monitor arm requires the use of an Allen wrench to adjust its height. Another monitor arm has a cranking mechanism that must be cranked-up to adjust the position of its height. Still another known monitor arm uses spring means to adjust the position of its height, but grinding springs to get uniform tension is difficult.

SUMMARY OF THE INVENTION

It is an object of this invention to provide a new adjustable monitor arm for a PC (personal computer), CRT (cathode ray tube), or VDT (video display tube) monitor that solves problems associated with the use of a personal computer at a work station and overcomes the shortcomings of the prior art monitor arms.

It is an object of this invention to provide an adjustable monitor arm that allows a personal computer to be shared by several operators positioned around one work station.

Another object of this invention is to provide a monitor arm having a height adjustability feature.

Another object is to provide a monitor arm having a platform for supporting a monitor that may be easily raised or lowered without changing the attitude of the platform.

Another object of the invention is to provide an adjustable monitor arm having a platform that may be easily tilted up or down by ten degrees to improve the viewing angle and to avoid glare.

Another object of the invention is to provide an adjustable monitor arm with a keyboard storage rack for storage of the keyboard when it is not being used.

Another object of the invention is to provide more work space on the desk or table top that would otherwise be taken up by the keyboard and monitor.

These objects are accomplished by providing an adjustable monitor arm apparatus for adjustably positioning a personal computer, cathode ray tube, or video display tube monitor, comprising a lower post, a lower swivel housing means mounted on the lower post and adapted to swivel 360 degrees, an upper arm having its lower end pivotally connected to an upper portion of the lower swivel housing means by a first pivot pin, a lower arm having its lower end pivotally connected to a lower portion of the lower swivel housing means by a second pivot pin, an upper housing, means pivotally connecting an upper end of the upper arm to the upper housing, means pivotally connecting the upper end of the lower arm to the upper housing, an upper post extending upwardly from the upper housing, support bracket means mounted on the upper post and adapted to swivel 360 degrees with the upper post, a platform adapted to support the monitor, saddle means mounted on the support bracket means and connected to the platform for adjusting the attitude of the platform to improve the viewing angle and to avoid glare, and a pneumatic gas cylinder having a cylinder portion, a piston adapted to reciprocate inside the cylinder portion and having a piston rod extending out of the cylinder portion, and a handle means for permitting movement of the piston in the cylinder portion, means connecting the bottom of the cylinder portion to the second pivot pin, means pivotally connecting the upper end of the piston rod to the upper housing, whereby the handle means may be activated to move the piston in the cylinder portion to raise or lower the platform without changing the attitude of the platform relative to the upper housing means, and means for attaching the lower post to the edge portion of a table or desk.

BRIEF DESCRIPTION OF THE DRAWINGS

FIG. 1 is a perspective view of an adjustable monitor arm apparatus being clamped to a table and supporting a monitor and a keyboard;

FIG. 2 is a front view of the monitor arm;

FIG. 3 is a side view in section taken as indicated by the lines and arrows 3—3 of FIG. 2;

FIG. 4 is a partial view in section of an alternative attachment means; and

FIG. 5 is a top plan view of the monitor arm apparatus with parts cut away showing the saddle means of the monitor arm apparatus.

DETAILED DESCRIPTION

Turning to the drawings, there is shown in FIG. 1 an adjustable monitor arm apparatus 11 for a personal computer, cathode ray tube, or video display tube monitor which includes attachment means 13 for attaching the monitor arm apparatus 11 to the edge portion of a table or desk. A lower swivel means 15 is adapted to swivel 360 degrees and is connected to attachment means 13, and an upper swivel means 17 is also adapted to swivel 360°. A pair of arms 19, 21 extend between lower swivel means 15 and upper swivel means 17. A platform 23 is mounted on upper swivel means 17 and swivels therewith. A pneumatic gas cylinder 25 is mounted between the top of upper arm 19 and the bottom of lower arm 21 for raising or lowering platform 23 without changing the attitude of platform 23.

Attaching means 13, as shown in FIGS. 1–3, may be a C-clamp 27 having a clamping bracket 29 with an opening 31 in its lower flange 33 that receives a clamping screw 35 which supports a clamping plate 37. C-clamp 27 is fastened onto a desk or table by turning a clamping rod 39 to move clamping plate 37 into secure engagement with the underside of the desk or table.

Alternatively, as shown in FIG. 4, a mounting plate 41 may be substituted for C-clamp 27. Plate 41 rests on the top surface of a table or desk and is secured thereto by a set of nuts 43 and bolts 45, with the bolts 45 extending through mounting plate 41 and the table or desk and being held in place by nuts 43 on the underside of the table or desk.

Lower swivel means 15 has a lower post 47 extending upwardly from attaching means 13, with a lower swivel housing 49 mounted on lower post 47 and adapted to swivel 360° about the post 47.

Upper arm 19 has its lower end 51 pivotally connected to an upper portion 53 of lower housing 49 by a pivot pin 55, and lower arm 21 has its lower end 57 pivotally connected to a lower portion 59 of lower housing 49 by a pivot pin 61.

The upper end 65 of upper arm 19 is connected to an upper housing 63 by a pivot pin 67, and the upper end 69 of lower arm 21 is connected to upper housing 63 by a pivot pin 71. A rotatable upper post 73 extends upwardly from upper housing 63 and has a support bracket 75 mounted on its top that is adapted to swivel 360° with upper post 73.

Saddle means 77 is mounted on support bracket 75, and platform 23 is mounted on saddle means 77. Saddle means 77 permits the attitude of platform 23 to be adjusted by 10° to improve the viewing angle and to avoid glare, and includes a base 79 having a bottom wall 81 and opposing side walls 83 and 85, a first roller 87 mounted between side walls 83 and 85 at one end of base 79, and a second roller 89 mounted between side walls 83 and 85 at the other end of base 79. A curved or bowed tilting plate 91 is mounted on the bottom of platform 23 and is adapted to roll on rollers 87 and 89.

Side walls 83 and 85 each have a central arcshaped opening 93, 95 that oppose one another.

Tilting plate 91 has a pair of tabs 97, 99 positioned on opposite sides of tilting plate 91 with tab 97 having a central opening 101 and tab 99 having a central opening 103.

Tabs 97, 99 are held in place by a bolt 105 which extends through tab openings 101 and 103 and side wall openings 93 and 95 to releasably connect plate 91 to base 79. Bolt 105 is threaded at one end and is provided with a locking knob 107 which when screwed inwardly locks side walls 83 and 85 of base 79 against the corresponding tabs 97 and 99 of plate 91 to hold tray 23 in a desired position.

Alternatively (not shown), plate 91 may be connected to and adjustably locked in place on base 79 by a pair of threaded bolts each having its own nut and locking knob with one of the bolts locking side wall 83 and tab 97 together and the other bolt locking side wall 85 and tab 99 together.

Platform 23 is provided with a keyboard storage rack 109 having an upturned lip and handle 111 and a pair of legs 113. Rack 109 is slidable out from under platform 23 for storing a keyboard when it is not in use. Storage rack 109 is supported by a pair of rack support plates 115 mounted on the underside of platform 23. Each rack support plate 115 has a central recess 117 in which one of the rack legs 113 slides. A cotter pin 119 is provided at the end of each rack leg 113 and the cotter pin 119 acts as a stop against the end of the rack support plate 115 to prevent rack legs 113 from sliding out of the supports 115 and detaching from the platform 23.

Pneumatic gas cylinder 25 has the bottom end of its cylindrical portion 121 connected to pivot pin 61 on lower housing 49, the upper end of its piston rod is connected to pivot pin 67 on upper housing 63. Pneumatic gas cylinder 25 is provided with an actuating handle 125 for activating movement of piston 123 in cylindrical portion 121 to raise or lower platform 23 without changing the attitude of platform 23.

In use, extension arms 19 and 21 are rotatable 360° around lower post 47, and monitor platform 23 is rotatable 360° around upper post 73, which permits a single personal computer to be used in more than one location at a work station. Accordingly, a personal computer may be shared by several operators positioned around one work station by turning the arms 19, 21 and platform 23 to the desired positions.

Adjusting the height of platform 23 and the monitor which it supports is easily accomplished by moving pneumatic gas cylinder handle 125, permitting piston 123 to move outwardly from cylindrical portion 121 to raise platform 23, or by moving pneumatic gas cylinder handle 125 and pressing arms 19 and 21 downwardly causing piston 123 to move inwardly into cylindrical portion 121 to lower platform 23. Raising or lowering platform 23 of monitor arm 11 does not change the attitude of platform 23.

The attitude of platform 23 may be adjusted by 10° to improve the viewing angle and to avoid glare, and this adjustment is easily accomplished by loosening locking knob 107 and rolling tilting plate 91 on rollers 87 and 89 to the desired position, and then relocking locking knob 107.

When the keyboard of the personal computer is not being used, it may be stored off the desk or table top on keyboard storage rack 109 which may be slid out from under platform 23. This feature not only provides a storage location for the keyboard, but also provides more work space on the desk or table top that would otherwise be taken up by the keyboard.

The pneumatic gas cylinder 25 may be a pneumatic piston and cylinder arrangement made by Stabilus GmbH, Koblenz-Neuendorf, West Germany, under the trademark BLOC-O-LIFT, and distributed by Gas Spring Co., Colmer, Pa. The pneumatic gas cylinder handle 125 opens and closes a valve at the head of the pneumatic gas cylinder 25. Raising platform 23 is accomplished by moving cylinder handle 125 to open the valve allowing the compressed air in the pneumatic gas cylinder 25 to expand and push piston 123 outwardly from the cylinder portion 121. Lowering platform 23 is accomplished by moving cylinder handle 125 to open the pneumatic gas cylinder valve while pressing arms 19 and 21 downwardly causing piston 123 to move inwardly in cylindrical portion 121 and re-compressing the air in the pneumatic gas cylinder 25.

We claim:

1. An adjustable monitor arm apparatus for adjustably positioning a computer, cathode ray tube, or video display tube monitor, comprising a lower post, a lower swivel housing means mounted on the lower post and adapted to swivel 360 degrees, an upper arm having its lower end pivotally connected to an upper portion of the lower swivel housing means by a first pivot pin, a lower arm having its lower end pivotally connected to a lower portion of the lower swivel housing means by a second pivot pin, an upper housing, means pivotally connecting an upper end of the upper arm to the upper housing, means pivotally connecting the upper end of the lower arm to the upper housing, an upper post extending upwardly from the upper housing, support bracket means mounted on the upper post and adapted to swivel 360 degrees with the upper post, a platform adapted to support the monitor, saddle means mounted on the support bracket means and connected to the platform for adjusting the attitude of the platform to improve the viewing angle and to avoid glare, and a pneumatic gas cylinder having a cylinder portion, a piston adapted to reciprocate inside the cylinder portion and having a piston rod extending out of the cylinder portion, and a handle means for permitting movement of the piston in the cylinder portion, means connecting the bottom of the cylinder portion to the second pivot pin, means pivotally connecting the upper end of the piston rod to the upper housing, whereby the handle means may be activated to move the piston in the cylinder portion to raise or lower the platform without changing the attitude of the platform relative to the upper housing means, and means for attaching the lower post to the edge portion of a table or desk.

2. The monitor arm apparatus of claim 1, the attaching means being a C-clamp.

3. The monitor arm apparatus of claim 1, the attaching means being a mounting plate that rests on the top surface of the table or desk, a bolt extending through the mounting plate and the table or desk, and a nut attached to the bolt on the underside of the table or desk to secure the lower post to the table or desk.

4. The monitor arm of claim 1, the saddle means including a base having a bottom wall and two opposing side walls, each opposing side wall having a matching central arc-shaped opening, a first roller mounted between the opposing side walls at one end of the base, a second roller mounted between the opposing side walls at the other end of the base, a curved tilting plate mounted on the underside of the platform and adapted to roll on the rollers, the tilting plate having a first and a second upwardly extending tab positioned on opposite sides of the tilting plate with each tab having a central opening, a bolt extending through the openings in the side walls and tabs, the bolt having a stop means at its first end for preventing the inward movement of the bolt first end portion beyond the stop means, the bolt being threaded at its second end portion, and a locking knob adapted to be screwed onto the second end portion of the bolt to adjustably lock the tilting plate to the base.

5. The monitor arm of claim 1, further including a keyboard storage rack having a handle mounted on the underside of the platform, the rack being slidable out from under the platform for storing a keyboard when the keyboard is not in use.

6. An adjustable monitor arm apparatus for adjustably positioning a computer, cathode ray tube, or video display tube monitor, comprising a lower post, a lower swivel housing means mounted on the lower post and adapted to swivel 360 degrees, an upper arm having its lower end pivotally connected to an upper portion of the lower swivel housing means by a first pivot pin, a lower arm having its lower end pivotally connected to a lower portion of the lower swivel housing means by a second pivot pin, an upper housing, means pivotally connecting an upper end of the upper arm to the upper housing, means pivotally connecting the upper end of the lower arm to the upper housing, an upper post extending upwardly from the upper housing, support bracket means mounted on the upper post and adapted to swivel 360 degrees with the upper post, a platform adapted to support the monitor, saddle means mounted on the support bracket means and connected to the platform for adjusting the attitude of the platform to improve the viewing angle and to avoid glare, a pneumatic gas cylinder having a cylinder portion, a piston adapted to reciprocate inside the cylinder portion and having a piston rod extending out of the cylinder portion, and a handle means for permitting movement of the piston in the cylinder portion, means connecting the bottom of the cylinder portion to the second pivot pin, means pivotally connecting the upper end of the piston rod to the upper housing, whereby the handle means may be activated to move the piston in the cylinder portion to raise or lower the platform without changing the attitude of the platform relative to the upper housing means, means for attaching the lower post to the edge portion of a table or desk, the attaching means being a C-clamp, the saddle means including a base having a bottom wall and two opposing side walls, each opposing side wall having a matching central arc-shaped opening, a first roller mounted between the opposing side walls at one end of the base, a second roller mounted between the opposing side walls at the other end of the base, a curved tilting plate mounted on the underside of the platform and adapted to roller on the rollers, the tilting plate having a first and a second upwardly extending tab positioned on opposite sides of the tilting plate with each tab having a central opening, a bolt extending through the openings in the side walls and tabs, the bolt having a stop means at its first end for preventing inward movement of the bolt first end portion beyond the stop means, the bolt being threaded at its second end portion, and a locking knob adapted to be screwed onto the second end portion of the bolt to adjustably lock the tilting plate to the base, and a keyboard storage rack having a handle mounted on the underside of the platform, the rack being slidable out from under the platform for storing a keyboard when the keyboard is not in use.

7. An adjustable monitor arm apparatus for adjustably positioning a computer, cathode ray tube, or video display tube monitor, comprising a lower post, a lower swivel housing means mounted on the lower post and adapted to swivel 360 degrees, an upper arm having its lower end pivotally connected to an upper portion of the lower swivel housing means by a first pivot pin, a lower arm having its lower end pivotally connected to a lower portion of the lower swivel housing means by a second pivot pin, an upper housing, means pivotally connecting an upper end of the upper arm to the upper housing, means pivotally connecting the upper end of the lower arm to the upper housing, an upper post extending upwardly from the upper housing, support bracket means mounted on the upper post and adapted to swivel 360 degrees with the upper post, a platform adapted to support the monitor, saddle means mounted on the support bracket means and connected to the platform for adjusting the attitude of the platform to improve the viewing angle and to avoid glare, a pneumatic gas cylinder having a cylinder portion, a piston adapted to reciprocate inside the cylinder portion and having a piston rod extending out of the cylinder portion, and a handle means for permitting movement of the piston in the cylinder portion, means connecting the bottom of the cylinder portion to the second pivot pin, means pivotally connecting the upper end of the piston rod to the upper housing, whereby the handle means may be activated to move the piston in the cylinder portion to raise or lower the platform without changing the attitude of the platform relative to the upper housing means, means for attaching the lower post to the edge portion of a table or desk, the attaching means being a mounting plate that rests on the top surface of the table or desk, a bolt extending through the mounting plate and the table or desk, and a nut attached to the bolt on the underside of the table or desk to secure the lower post to the table or desk, the saddle means including a base having a bottom wall and two opposing side walls, each opposing side wall having a matching central arc-shaped opening, a first roller mounted between the opposing side walls at one end of the base, a second roller mounted between the opposing side walls at the other end of the base, a curved tilting plate mounted on the underside of the platform and adapted to roll on the rollers, the tilting plate having a first and a second upwardly extending tab positioned on opposite sides of the tilting plate with each tab having a central opening, a bolt extending through the openings in the side walls and tabs, the bolt having a stop means at its first end for preventing inward movement of the bolt first end portion beyond the stop means, the bolt being threaded at its second end portion, and a locking knob adapted to be screwed onto the second end portion of the bolt to adjustably lock the tilting plate to the base, and a keyboard storage rack having a handle mounted on the underside of the platform, the rack being slidable out from under the platform for storing a keyboard when the keyboard is not in use.

* * * * *